(12) United States Patent
Tominaga et al.

(10) Patent No.: US 7,228,219 B2
(45) Date of Patent: Jun. 5, 2007

(54) STRAIGHT RUNNING JUDGING DEVICE FOR VEHICLES

(75) Inventors: Motonori Tominaga, Anjo (JP); Yukio Mori, Nagoya (JP); Takeyasu Taguchi, Nagoya (JP)

(73) Assignees: Advics Co., Ltd., Aichi-pref. (JP); Nippon Soken, Inc., Nishio (JP)

( * ) Notice: Subject to any disclaimer, the term of this patent is extended or adjusted under 35 U.S.C. 154(b) by 631 days.

(21) Appl. No.: 10/489,617

(22) PCT Filed: Feb. 12, 2003

(86) PCT No.: PCT/JP03/01458

§ 371 (c)(1),
(2), (4) Date: Mar. 23, 2004

(87) PCT Pub. No.: WO03/069353

PCT Pub. Date: Aug. 21, 2003

(65) Prior Publication Data

US 2004/0243293 A1     Dec. 2, 2004

(30) Foreign Application Priority Data

Feb. 18, 2002   (JP) .............................. 2002-040166

(51) Int. Cl.
*G01C 17/38*   (2006.01)
(52) U.S. Cl. .............................. 701/96; 701/74; 701/35
(58) Field of Classification Search .................. 701/96, 701/36, 41, 42, 93, 35, 33, 74, 71, 75; 702/96, 702/14; 700/279; 303/173–189
See application file for complete search history.

(56) References Cited

U.S. PATENT DOCUMENTS 5,058,019 A * 10/1991 Litkouhi ....................... 701/74

(Continued)

FOREIGN PATENT DOCUMENTS

DE         10058140 A1      1/2004

(Continued)

OTHER PUBLICATIONS

First Examination Report issued from German Patent Office issued on Nov. 28, 2005 for the corresponding German patent application No. 103 92 140.0-52 (a copy and English translation thereof).

*Primary Examiner*—Richard M. Camby
(74) *Attorney, Agent, or Firm*—Posz Law Group, PLC

(57) ABSTRACT

A straight running state is accurately determined using only wheel speed data in any running state. Based upon right and left wheel speed values calculated by a wheel speed calculating mechanism (13) from detection values of right and left wheel speed sensors (11, 12), a wheel speed ratio calculating mechanism (21), a distance calculating mechanism (31), and a distance ratio calculating mechanism (32) respectively calculate a right and left wheel speed ratio, an actual running distance, a linear distance, and a distance ratio of the two distances at every preset checkpoint (CP). A wheel speed ratio change amount evaluating mechanism (24) extracts CPs at times where a change amount of the wheel speed ratio is relatively small as effective CPs, and a determining mechanism (43) determines an effective CP with the smallest distance ratio from among the effective CPs as in a straight running state.

15 Claims, 17 Drawing Sheets

U.S. PATENT DOCUMENTS

| | | |
|---|---|---|
| 5,494,344 A | 2/1996 | Heyn et al. |
| 5,631,836 A | 5/1997 | Poggenburg et al. |
| 6,745,143 B1 | 6/2004 | Gronau et al. |

FOREIGN PATENT DOCUMENTS

| | | |
|---|---|---|
| JP | A-H01-304312 | 12/1989 |
| JP | A-7-306216 | 11/1995 |
| JP | A-11-180330 | 7/1999 |

* cited by examiner

STRAIGHT RUNNING JUDGING DEVICE FOR VEHICLES

FIELD OF THE INVENTION

The present invention relates to a straight running judging device for determining whether a vehicle is running straight, and as such, for example, is suitable for use in a tire air pressure warning device of a dynamic loaded radius system utilizing a difference in rotational speed between right and left wheels.

BACKGROUND OF THE INVENTION

Conventionally, there is a tire air pressure warning device in a dynamic loaded radius system, which utilizes a fact that a tire rolling radius while a vehicle is running is proportional to air pressure in the tire to detect a decrease in tire air pressure based upon the tire rolling radius of each wheel, or more specifically, the difference in rotational speed between right and left wheels, and outputs a warning. In this case, even if both the right and left wheels have a proper pressure with no decrease in air pressure, the turning radii of the right and left wheels of the vehicle differ while the vehicle is turning, wherein a turning radius of the outer turning wheel is larger than that of the inner turning wheel. Therefore, the speed of the outer turning wheel becomes faster than that of the inner turning wheel, and furthermore, the wheel radius of the outer turning side becomes smaller than the wheel radius of the inner turning side due to the load shift of the vehicle while turning. Thus, a correct tire air pressure cannot be detected. Accordingly, an art that determines whether a vehicle is running straight, and determines an air pressure decrease based upon a measurement value during straight running is supposed.

Examples of such art include, for example, an art disclosed in Japanese Patent Laid-Open Publication No. HEI7-172121, that detects a vehicle turning state inappropriate to an air pressure determination using a steering sensor, and an art disclosed in Japanese Patent Laid-Open Publication No. HEI8-282222, that uses an average value of the right and left wheel speed ratio within a predetermined period as a reference and determines that the vehicle is turning when a predetermined difference occurs in relation to the average value. However, the former requires other sensors in addition to the wheel speed sensor, such as a steering sensor and depending on the case, a lateral G sensor and yaw rate sensor, which in turn increases cost. Furthermore, in the latter, for example, the average value itself becomes an inappropriate value for indicating an intermediate state between straight running and turning, as can be seen clearly on an oval course or the like where straight running and turning in a fixed direction are repeated, instead of an appropriate value indicating an average value of straight running. Thus, when this value is used as a reference value to determine straight running, the intended effect cannot be obtained.

SUMMARY OF THE INVENTION

The present invention has been devised in consideration of the problems stated above. It is an object of the present invention to accurately determine straight running of a vehicle using only wheel speed data.

In order to achieve the above object, in a first aspect of the present invention, it is characterized that a wheel speed detecting mechanism for detecting a right and left wheel speed of the vehicle; a distance calculating mechanism for calculating an actual running distance actually traveled by the vehicle between two points and a linear distance between the two points based upon the detected wheel speed; a distance comparing and calculating mechanism for comparing the calculated actual running distance and linear distance, and calculating a distance comparison value; and a determining mechanism for determining straight running based upon the distance comparison value are provided.

According to the first aspect, based upon the distance comparison value, which is a comparison result of the actual running distance of the vehicle and the linear distance between two points accompanying vehicle running calculated from the detected vehicle right and left wheel speeds, it is determined whether the vehicle is running straight. That is, straight running is determined if the distance comparison value is a value, or a value in a vicinity thereof, indicating that the actual running distance and the linear distance are equal. Thus, straight running can be accurately determined using only wheel speed data detected by a wheel speed sensor.

Note that the distance comparison value may be any value as long as it is a value indicating a large-small relationship between the actual running distance and the linear distance. For example, in the case of a distance ratio between the actual running distance and the linear distance, the distance ratio becomes 1 or a value close to 1 during straight running, and in the case of a difference in distance (or an absolute value of the distance difference) between the actual running distance and the linear distance, the distance difference becomes 0 or a value close to 0 during straight running.

Furthermore, in a second aspect of the present invention, it is characterized that a wheel speed detecting mechanism for detecting a right and left wheel speed of the vehicle; a wheel speed relative amount calculating mechanism for calculating a wheel speed relative amount between right and left wheel speeds from the detected wheel speed; a checkpoint detecting mechanism for detecting an effective checkpoint for setting a point for determining straight running based upon the calculated wheel speed relative amount; a distance calculating mechanism for calculating an actual distance actually traveled by the vehicle between two points and a linear distance between the two points based upon the detected wheel speed; a distance comparing and calculating mechanism for comparing the calculated actual running distance and linear distance, and calculating a distance comparison value; and a determining mechanism for determining straight running based upon the distance comparison value and the detected effective checkpoint are provided.

According to the second aspect, in addition to detecting an effective checkpoint with the possibility of corresponding to a change point between straight running and turning based upon the wheel speed relative amount between the right and left wheel speeds of the vehicle, the distance comparison value between the actual running distance of the vehicle and the linear distance are calculated from the wheel speed, and straight running is determined by the distance comparison value at every effective checkpoint. Therefore, straight running can be accurately determined by the distance comparison value, which is a value indicating the actual running distance and the linear distance are equal, or a value in the vicinity thereof, during straight running at each effective checkpoint detected in a time series by only a sensor that detects the wheel speed.

Note that the wheel speed relative amount, as with the distance comparison value described above, may be any value as long as it is a value indicating a large-small relationship between the right and left wheel speeds. For example, the value may be a speed ratio that is a ratio between the right and left wheel speeds, or a speed difference (or an absolute value of the speed difference) that is a difference between the right and left wheel speeds.

The actual running distance can be calculated by integrating the wheel speed from a calculation start point using the distance calculating mechanism as mentioned in a third aspect of the present invention.

In addition, the linear distance can be calculated as a linear distance from the calculation start point set as a start point up to the present time using the distance calculating mechanism as mentioned in a fourth aspect of the present invention.

Furthermore, the linear distance can be calculated as a linear distance from the effective checkpoint set as a start point every calculation cycle using the distance calculating mechanism as mentioned in a fifth aspect of the present invention.

In a sixth aspect of the present invention, it is characterized that the distance calculating mechanism calculates a turning angle of the vehicle from the vehicle wheel tread and right and left wheel speeds, calculates a coordinate at the present time based upon a cumulative value of the turning angle from the start point and the wheel speeds, and calculates the linear distance from the coordinate.

Accordingly, by finding the coordinates of the present point based on the cumulative value of the turning angle of the vehicle from the start point and the right and left wheel speeds, the linear distance between two points can be calculated as the linear distance between the start point and the present point. Note that the cumulative value of the turning angle of the vehicle can be calculated from the wheel tread of the vehicle and the right and left wheel speeds. Thus, the linear distance can be obtained using only the wheel speed detecting mechanism as a sensor.

The distance comparison value can be calculated as a ratio of the actual running distance and the linear distance between the two effective checkpoints using the distance ratio calculating mechanism, which sets the effective checkpoint as one time point of the two points as mentioned in a seventh aspect of the present invention.

The effective checkpoint detected using the checkpoint detecting mechanism is detected by comparing the wheel speed relative amount and the checkpoint threshold value as mentioned in a eighth aspect of the present invention, or the effective checkpoint is detected by comparing the change amount of the wheel speed relative amount and the checkpoint threshold value as mentioned in a tenth aspect of the present invention.

In this case, the checkpoint threshold value compared with the wheel speed relative amount and the checkpoint threshold value compared with the change amount of the wheel speed relative amount are respectively preset with consideration for the size of the physical quantity of the compared subjects.

In addition, the effective checkpoint is detected by the checkpoint detecting mechanism in any one of the cases when the wheel speed relative amount changes from a value lesser to a value greater than the checkpoint threshold value, and when the wheel speed relative amount changes from a value greater to a value lesser than the checkpoint threshold value as mentioned in a ninth aspect of the present invention.

Furthermore, as mentioned in a twelfth aspect of the present invention, the effective checkpoint is detected by extracting a predetermined checkpoint based upon the size of a change amount of the wheel speed relative amount among preset checkpoints. In this case, for example, a checkpoint is generated at every fixed time during vehicle running or at every fixed distance, and according to the size of the change amount of the wheel speed relative amount, a checkpoint at which a change amount of the wheel speed relative amount is in a predetermined range is extracted from among the pre-checkpoints and detected as the effective checkpoint as mentioned in a thirteenth aspect of the present invention.

The determination of straight running by the determining mechanism can be executed by comparing the distance comparison value and the straight running determination threshold value as mentioned in an eleventh aspect of the present invention. Furthermore, the straight running can alternatively be determined at an effective checkpoint at which a difference between the actual running distance and the linear distance is the smallest value among the distance comparison values of the effective checkpoints. Note that the distance comparison value having the smallest value for the difference between the actual running distance and the linear distance signifies the distance ratio becoming the value closest to 1 in the case of the comparison value being the distance ratio, and signifies the distance difference becoming the value closest to 0 in the case of the comparison value being the distance difference.

In a fifteenth aspect of the present invention, it is characterized that the determining mechanism further includes a straight running data selecting mechanism that sets a wheel speed relative amount when straight running is determined as a reference value for determining a straight running state, and determines a straight running state when a wheel speed relative amount at the preset checkpoint following a setting time point of the reference value for determining a straight running state is a value in the vicinity of the reference value for determining a straight running state.

Accordingly, the determining mechanism sets, as the effective checkpoint from among the preset checkpoints, a checkpoint at which the change in the wheel speed relative amount is relatively small, and the distance comparison value is a value with the smallest difference between the actual running distance and the linear distance. The determining mechanism sets the wheel speed relative amount at the effective checkpoint as the reference value for determining a straight running state, and thereafter, determines the preset checkpoints at which the wheel speed relative amount is a value in the vicinity of the reference value for determining a straight running state as straight running. Therefore, accurate determination of straight running can be continued with a simple system.

DETAILED DESCRIPTION OF THE PREFERRED EMBODIMENTS

Embodiments of the present invention will be described in detail with reference to the accompanying drawings.

First Embodiment

Figure 1:
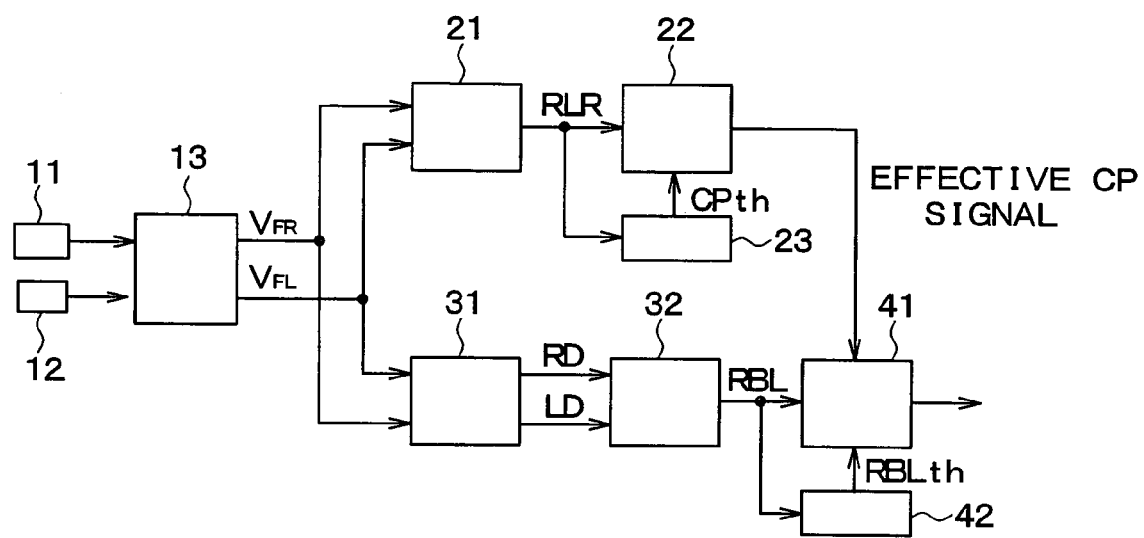
FIG. 1 is a function block diagram showing the construction of a device for determining straight running of a vehicle according to a first embodiment of the present invention.

FIG. 1 is a drawing showing function blocks according to a first embodiment. A signal is input to a wheel speed calculating mechanism 13 every 5 ms from a right wheel speed sensor 11 and a left wheel speed sensor 12, which respectively detect rotational speeds of the front right and left wheels that are driven wheels. The wheel speed calculating mechanism 13 calculates and outputs average values VFR, VFL for 200 pieces of data during 1 second for each sensor signal every second. In the present invention, straight running can be determined in any case without a change in determination results whether the right and left wheel speed is that of the right and left driven wheels, or the right and left non-driven wheels, in other words, whether the right and left wheel speed is that of the front right and left wheels or rear right and left wheels. In the following description, the average values VFR, VFL are respectively called a right wheel speed and a left wheel speed, or simply wheel speed. In addition, a calculation cycle $\Delta t$ in each mechanism described hereafter is a cycle of the wheel speed averaging processing, and 1 cycle lasts, for example, a duration of 1 second. Both the sensor signal output cycle and the calculation cycle for each calculating mechanism can be arbitrarily set as necessary.

The wheel speeds VFR, VFL are input to a wheel speed ratio calculating mechanism 21, which is a wheel speed relative amount calculating mechanism. The wheel speed ratio calculating mechanism 21 calculates and output wheel speed ratio RLR=VFR/VFL. In addition, the wheel speeds VFR, VFL are input to a distance calculating mechanism 31. According to a method to be described later, the distance calculating mechanism 31 calculates and outputs an actual running distance RD, which is the distance actually traveled from a position at which vehicle calculation was initiated up to the present position, and a linear distance LD, which is the distance between a position at which vehicle calculation was initiated and the present position. Note that as long as the wheel speed relative amount indicates a large-small relationship of the right and left wheel speeds, it may be either the difference between or ratio of the two wheel speeds. Namely, as the value in the case of the difference in speed approaches 0 and as the value in the case of the speed ratio approaches 1, their respective Furthermore, various threshold values to be described later can be appropriately obtained depending on whether the relative amount is a difference value or ratio value. In the present embodiment, the wheel speed ratio is used as the wheel speed relative amount.

The calculated wheel speed ratio RLR is input to a checkpoint detecting mechanism 22. The checkpoint determines the time at which it is determined whether the vehicle is running straight. If there are a plurality of checkpoints, the time at which the above determination is executed is in particular called an effective checkpoint. Hereinafter, check point shall be referred to as CP. The CP detecting mechanism 22 compares a CP detection threshold value CPth output from a CP threshold value setting mechanism 23 and the right and left wheel speed ratio RLR, determines the effective CP depending on the result, and outputs an effective CP signal.

Meanwhile, the calculated actual running distance RD and linear distance LD are input to a distance ratio calculating mechanism 32, which is a mechanism for calculating distance ratio. The distance ratio calculating mechanism 32 calculates a distance ratio RBL=RD/LD from the actual running distance RD and the linear distance LD in the calculation cycle $\Delta t$, which is outputted as a distance comparison value. Note that as long as the distance comparison value indicates a large-small relationship of the actual distance and linear distance, it may be either the difference between or ratio of the two distances. Namely, as the value in the case of the difference in distance approaches 0 and as the value in the case of the distance ratio approaches 1, their respective similarity to a straight running state is shown. In the present embodiment, the distance ratio is used as the distance comparison value.

A determining mechanism 41 inputs the effective CP signal from the CP detecting mechanism 22 and a straight running determination threshold value RBLth from a straight running determination threshold setting mechanism 42, as well as a distance ratio RBL from the distance ratio calculating mechanism 32. If the distance ratio RBL at the effective CP is equal to or less than the straight running determination threshold value RBLth, the determining mechanism 41 determines a straight running state in which the difference between the actual running distance RD and the linear distance LD is small, and outputs a straight running signal.

Figure 2:
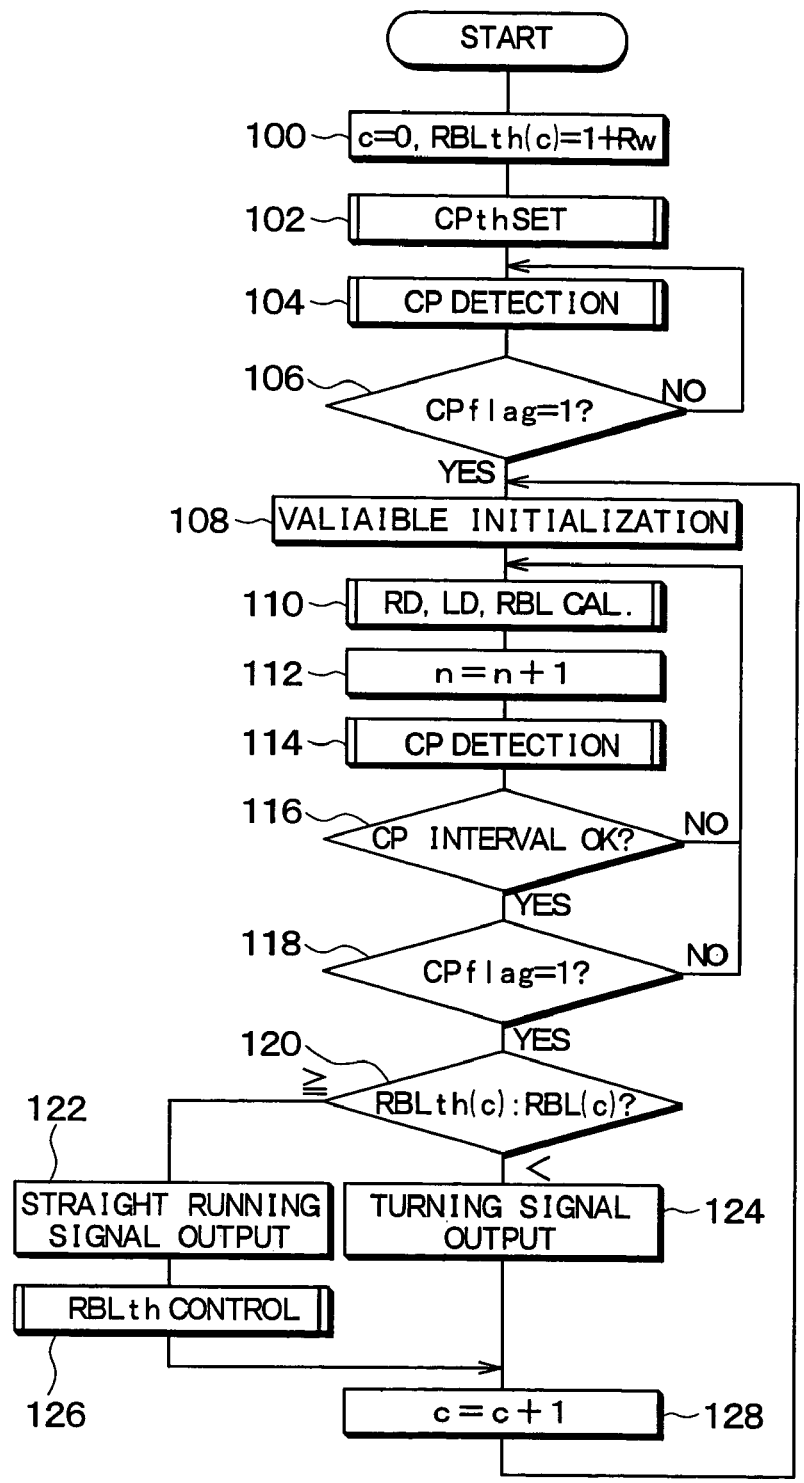
FIG. 2 is a main flowchart of the device for determining straight running of a vehicle according to the first embodiment of the present invention.

Each function of the wheel speed calculating mechanism 13, wheel speed ratio calculating mechanism 21, CP detecting mechanism 22, CP threshold value setting mechanism 23, distance calculating mechanism 31, distance ratio calculating mechanism 32, determining mechanism 41, and straight running determination threshold value setting mechanism 42 are realized by executing a computer program in a CPU in an on-board controller (not shown). These operations will be described based upon flowcharts. FIG. 2 is a drawing showing a main flow of the device for determining straight running of the vehicle according to the first embodiment.

[Initial Setting]

When the vehicle is started, for example, when the vehicle starts running due to turning the ignition ON, a determination counter value c which indicates a count that determined whether the vehicle is running straight is initialized to c=0, and the straight running determination threshold value RBLth is initialized to RBLth=1+Rw in step 100. In this case, if Rw is a number in the vicinity of 1, for example, 0.1, the threshold value RBLth(0)=1.1. Note that the right and left wheel speeds VFR, VFL are not particularly shown in the flowchart, however, the right and left wheel speeds VFR, VFL are sequentially calculated in the calculation cycle Δt by the controller CPU.

Figure 3:
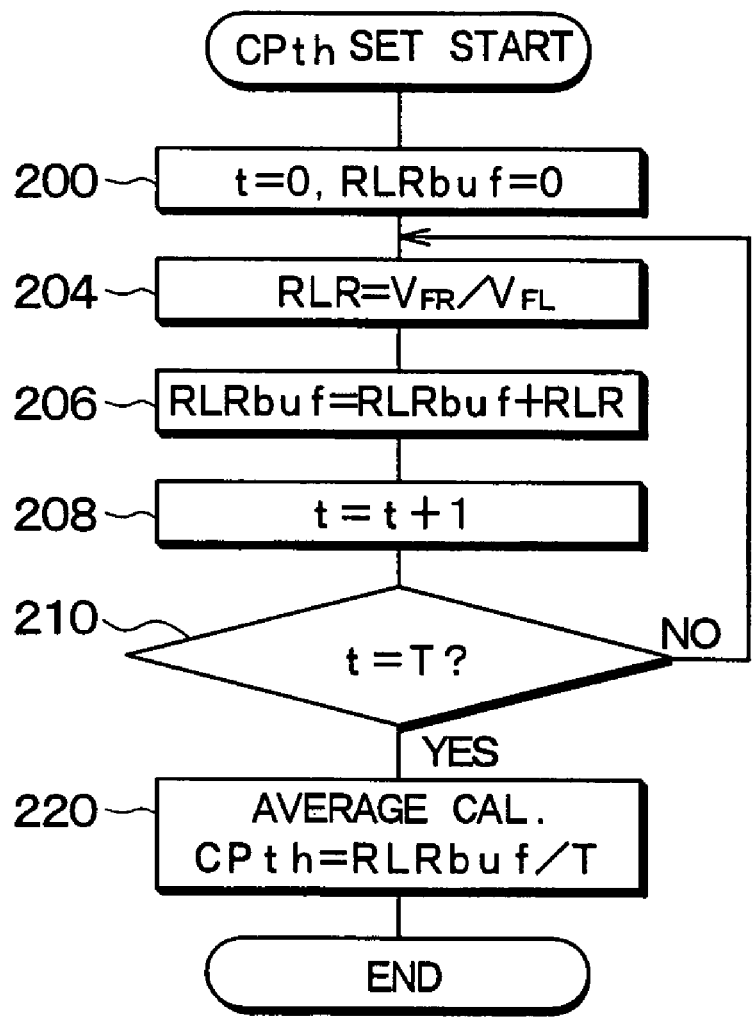
FIG. 3 is a flowchart for a CP detection threshold value CPth set in the device for determining straight running of a vehicle according to the first embodiment of the present invention.

Next in step 102, the CP detection threshold value CPth is set. The routine will be described in detail with reference to the flowchart in FIG. 3. First, in step 200, a time counter value t is initialized to t=0, and a wheel speed ratio integrated buffer value RLRbuf is initialized to RLRbuf=0. The wheel speed ratio RLR=VFR/VFL is then calculated every second of a calculation cycle in step 204. These steps correspond to the functions of the vehicle speed calculating mechanism 13 and the wheel speed ratio calculating mechanism 21. In step 206, the calculated wheel speed ratio RLR is added to the wheel speed ratio integrated buffer value RLRbuf, and the time counter value t is increased by an increment of 1 in step 208. In step 210, it is determined whether the time counter value t has reached a predetermined time T set in advance. If the predetermined time T has not been reached, the processing returns to step 204, and if reached, the processing shifts to step 220. In step 220, the wheel speed ratio integrated buffer value RLRbuf is averaged with the predetermined time T, and the value thus obtained is set as the CP detection threshold value CPth. Note that the predetermined time T is set as 100 to 200 calculation cycles, for example, 150 seconds. Accordingly, the CP detection threshold value CPth calculated and set in step 220 is an average value of the wheel speed ratio RLR during a fixed time (150 seconds), and corresponds to a change center value of the right and left wheel speed ratio. The processing from step 200 to 220 corresponds to the functions of the CP threshold value setting mechanism 23 and the wheel speed ratio calculating mechanism 21.

In an ideal state with no change in tire radius, road surface conditions and the like, the change in the value for the wheel speed ratio RLR corresponds to changes in the turning angle, that is, the change from straight running (turning angle=0) to turning, and the change from turning to straight running (including switching from right turning to left turning). In an actual running state, changes in the wheel speed ratio do not necessarily indicate changes in the turning angle due to changing factors such as changes in tire radius due to tire rotation, road surface unevenness, and friction between the tire and road surface. However, in the present embodiment, the change center value of the wheel speed ratio is regarded as having a high possibility of correspondence with the point of switching between straight running and turning, and is thus used as a threshold value for detecting the CP after the initial setting.

[Initial CP Detection]

Once the CP detection threshold value CPth is set, the first effective CP is detected in the next step 104. The routine will be described in detail with reference to the flowchart in FIG. 4. In the routine, a change in the wheel speed ratio RLR that exceeds the level of the CP detection threshold value CPth, that is, the time at which RLR changes from a value lesser to a value greater than CPth, or the time at which RLR changes from a value greater to a value lesser than CPth, are respectively determined as the CP.

In step 300, a CP flag set to 1 when a CP is detected is initialized to CPflag=0. A wheel speed ratio RLR(n) at the present time, i.e., in n-th calculation cycle, is then calculated in step 302. In step 304, if n is equal to or less than 1, the routine is ended due to insufficient data for detecting a CP, and if n is equal to 2 or greater, the routine shifts to step 306. In step 306, wheel speed ratio RLR(n−1) calculated in the previous cycle and the CP detection threshold value CPth set in step 102 are compared. If RLR(n−1)>CPth, the routine shifts to step 308; if RLR(n−1)<CPth, the routine shifts to step 310; and if RLR(n−1)=CPth, RLR is determined as undergoing a large change, that is, the CP is detected, and the routine shifts to step 312.

In step 308, the wheel speed ratio RLR(n) calculated in the present cycle and the CP detection threshold value CPth set in step 102 are compared. If RLR(n)<CPth, RLR(n−1)>CPth>RLR(n), thus RLR has greatly changed, therefore the CP is detected and the routine shifts to step 312. If RLR(n−1)≧CPth, the change in RLR is small, therefore the CP is not detected and the routine is ended. Meanwhile, in step 310, the wheel speed ratio RLR(n) and the CP detection threshold value CPth are compared. If RLR(n)>CPth, RLR(n−1)<CPth<RLR(n), thus RLR has greatly changed, therefore the CP is detected and the routine shifts to step 312. If RLR(n−1)≦CPth, the change in RLR is small, therefore the CP is not detected and the routine is ended.

The detection of the CP can be performed in any one of steps 306, 308 and 310, therefore the CP flag is set to CPflag=1 in step 312. The processing in step 104 comprising steps 300 to 312 corresponds to step 114 to be described later and the functions of the CP detecting mechanism 22 and the wheel speed ratio calculating mechanism 21.

Figure 6:
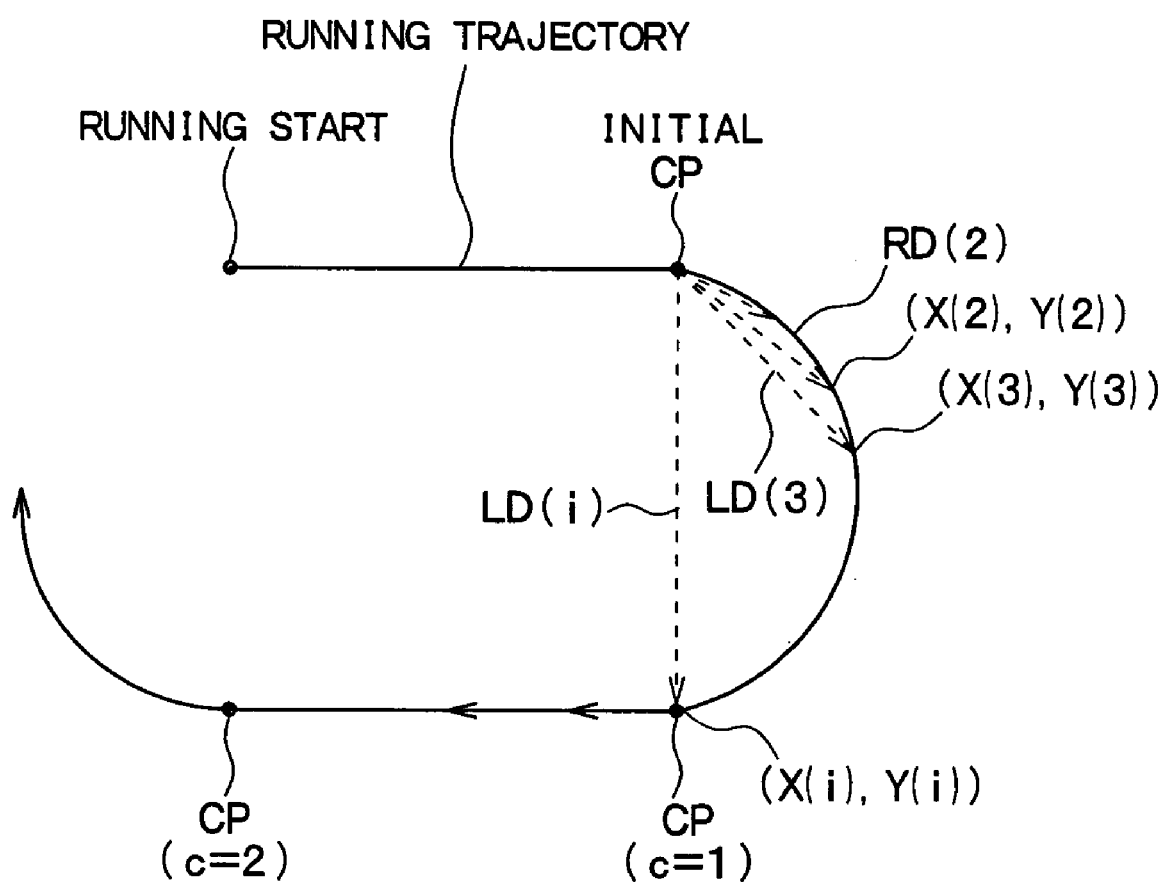
FIG. 6 is a drawing showing an example of a running trajectory of the device for determining straight running of a vehicle according to the first embodiment of the present invention.
Figure 7:
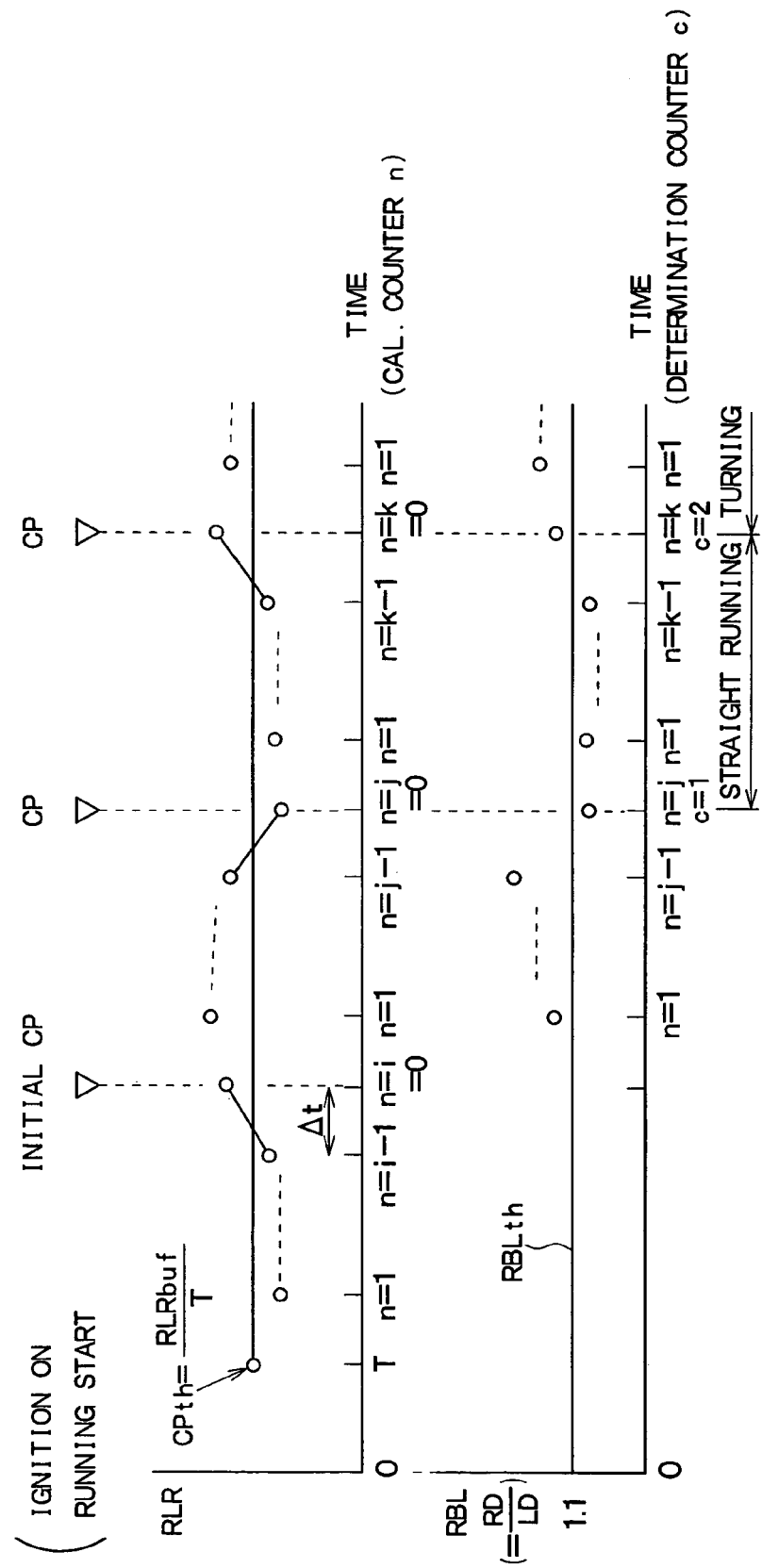
FIG. 7 is a time chart showing processing for the running trajectory in FIG. 6.

Hereinafter, CP detection conditions are described with an example in FIG. 7. Note that the time chart relating to the wheel speed ratio RLR and the distance ratio RBL in FIG. 7 is drawn corresponding to a running trajectory of a vehicle from a start point shown in FIG. 6. In the example in FIG. 7, an initial CP is detected at n=i because during straight running after the vehicle starts running, a change expressed as RLR(i−1)<CPth<RLR(i) occurred as a result of the calculation in the previous cycle (calculation counter n=i−1) and the present cycle (n=i). Note that as shown in FIG. 7, the calculation counter n is reset to 0 in step 108 to be described later.

Next in step 106 of FIG. 2, it is determined whether CP flag CPflag is 1. If it is 1, the processing shifts to step 108, wherein processing for the second and subsequent CP detection, and the straight running determination are repeatedly executed; if not 1, the processing returns to step 104, wherein the processing for initial CP detection is executed.

The steps up to step 106 are initial settings once the ignition is turned ON, and through these steps, the initial CP is detected, which serves as a base point for calculating the actual running distance RD, the linear distance LD, and the distance ratio RBL=RD/LD.

[Running Straight Determination Based Upon Distance Ratio at CP]

In step 108, the calculation counter n, the actual running distance RD(n=0) (hereinafter the nth calculation result is shown as RD(n)), the linear distance LD(0), in addition to a right and left wheel average wheel speed Vave, an x coordinate X(0), a y coordinate Y(0), and a turning angle cumulative value θall(0) to be described later are all set to 0 in a variable initialization processing.

Figure 5:
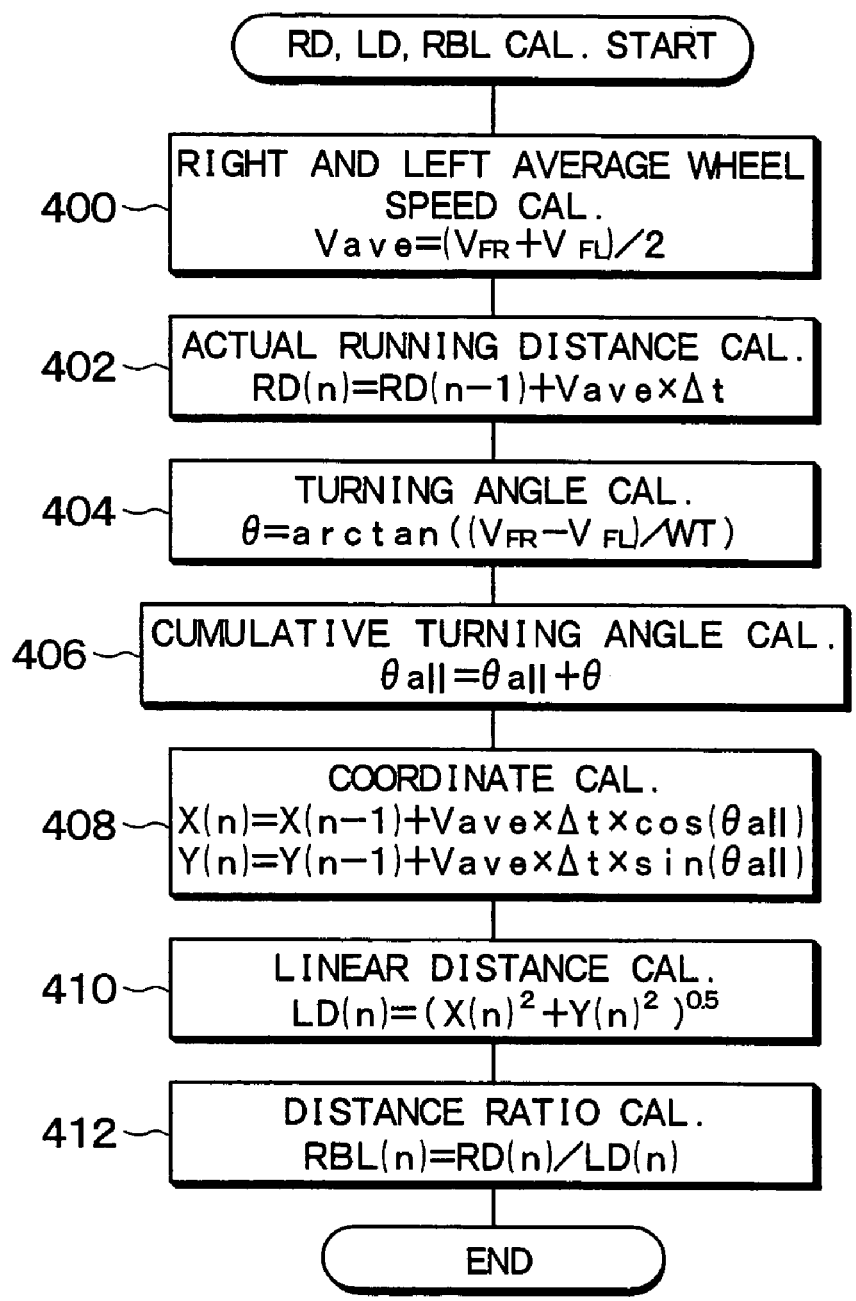
FIG. 5 is flowchart for calculating an actual running distance, linear distance, and distance ratio in the device for determining straight running of a vehicle according to the first embodiment of the present invention.

In step 110, the actual running distance RD and the linear distance LD, in addition to the distance ratio RBL=RD/LD, which is a ratio of the actual running distance and the linear distance, are respectively calculated. The routine is shown in detail in FIG. 5. At the calculation point in step 400, the right and left average wheel speed Vave is calculated from Vave=(VFR+VFL)/2 using the right wheel speed VFR and the left wheel speed VFL. The average wheel speed Vave corresponds to the vehicle moving speed. In step 402, the actual running distance RD(n) of the n-th calculation cycle is approximated by adding the vehicle moving speed Vave×Δt during 1 calculation cycle Δt found with the present average vehicle speed Vave to the calculation result RD(n−1) of the previous cycle as shown in equation 1.

(Equation 1)

$$RD(n)=RD(n-1)+Vave \times \Delta t \quad (1)$$

Next in step 404, a turning angle θ during 1 calculation cycle of the n-th calculation is calculated in equation 2 from the right and left wheel speeds VFR, VFL and a front wheel tread WT. Note arctan is an arctangent.

(Equation 2)

$$\theta=\arctan((VFR-VFL)/WT) \quad (2)$$

In step 406, the turning angle cumulative value θall up to the n-th calculation is increased by increment of the turning angle θ. In step 408, vehicle position coordinate values X(n), Y(n) on a flat running surface are calculated in equation 3.

(Equation 3)

$$X(n)=X(n-1)+Vave \times \Delta t \times \cos(\theta all),$$

$$Y(n)=Y(n-1)+Vave \times \Delta t \times \sin(\theta all) \quad (3)$$

In step 410, a linear distance LD(n) from the time n=0 in the n-th calculation, i.e., from the previous CP, is calculated in equation 4 using the x coordinate value and the y coordinate value.

(Equation 4)

$$LD(n)=(X(n)^2+Y(n)^2)^{0.5} \quad (4)$$

In step 412, the distance ratio RBL of the actual running distance RD and the linear distance LD calculated in steps 402 and 410 is calculated in equation 5.

(Equation 5)

$$RBL(n)=RD(n)/LD(n) \quad (5)$$

The processing from steps 400 to 412 corresponds to the functions of the distance calculating mechanism 31 and the distance ratio calculating mechanism 32. FIG. 6 shows the relationship between RD and LD. RD, LD, and RBL are calculated at the calculation cycle Δt with the CP as a base point. The linear distance LD at the calculation counter value n=1, 2, . . . , i are respectively shown with dotted lines in FIG. 6. The actual running distance RD is similarly calculated at every Δt as a cumulative value of minute linear distances that substantially follow the running trajectory, and the distance ratio RBL is calculated at every Δt as a ratio of the two distances.

Referring back to FIG. 2, after increasing the calculation counter n by an increment of 1 in synchronization with the calculation cycle Δt in step 112, the CP is detected in step 114. The details of the CP detection processing is identical to that described earlier in the flowchart in FIG. 4, and thus description are omitted.

Next in step 116, the propriety of the interval between the CP previously and presently detected is determined. The propriety is determined by whether the elapsed time between the two CPs is equal to or greater than a predetermined value, or whether the actual running distance RD between the CPs is equal to or greater than a predetermined value. If the CP interval is determined long in terms of time or distance, the detected CP is output as the effective CP. If the CP interval is determined short, the detected CP is determined invalid and the processing returns to step 110, wherein the RD, LD, and RBL calculations are continued. Through the execution of step 116, a CP detected with a short interval can be determined invalid and excluded, which allows prevention of chattering in the straight running determination.

In step 118, it is determined whether CP flag CPflag is 1. If it is not 1, the processing returns to step 110 because a CP has not been detected; if it is 1, the processing shifts to step 120.

In step 120, a distance ratio RBL(c)=RD(c)/LD(c) calculated in step 412 at the time a CP was detected and a straight running determination threshold value RBLth(c) (=1.1) set in step 100 are compared. If RBL(c) is equal to or less than the threshold value, a straight running state is determined since the difference between the actual running distance and the linear distance is small or the two distances are substantially the same, and the processing shifts to step 122 to output a straight running signal. Otherwise, the actual running distance RD is greater than the linear distance LD, that is, a turning state is determined, and the processing shifts to step 124 to output a turning signal. Then, in step 128, a determination counter c is increased by an increment of 1.

Hereinafter, the processing results according to execution of steps 108 onward will be described with reference to FIG. 7. After the initial CP is detected at the calculation counter n=i, the wheel speed ratio RLR, the actual running distance RD, the linear distance LD, and the distance ratio RBL are calculated at every Δt. In FIG. 7, where RLR(j−1)>CPth at calculation counter n=j−1, a relation RLR(j)<CPth is established at n=j, therefore a CP is detected at n=j and the calculation counter n is reset. At the same time, the comparison result is RBL(j)<RBLth, therefore a straight running state is determined at this time and the determination counter is set to c=1. The next CP is detected at the time calculation counter n=k, at which RLR greatly changes and exceeds CPth, and the calculation counter n is reset. Since RBL(k)>RBLth, a turning state is determined at this time, and the determination counter is set to c=2. Such the processing is subsequently continued for as long as the vehicle is running.

When a straight running signal is output, the straight running determination threshold value RBLth is corrected and controlled in step 126; the details of which will be described using a flowchart in FIG. 8 and a time chart in FIG. 9. Note that hereinafter the RBL value that is equal to or less than the straight running determination threshold value, and determined as straight running in the previous cycle, is indicated as RBLrec.

In step 500, it is determined whether RBLrec is a maximum value of an initial value Init, for example, 999. The initial value Init is set as RBLrec=Init in step 100. If RBLrec is equal to Init, the routine is ended since it is the initial straight running determination. Otherwise, the processing shifts to step 502 since it is the second or subsequent straight running determination threshold value setting. That is, the straight running determination threshold value RBLth=1+Rw=1.1 set in step 100 is used for the initial straight running determination, and from the second straight running determination onward, the RBLth is corrected and controlled by the routine in step 502 onward.

In step 502, it is determined whether RBL(c) at the time of CP detection is greater than RBLrec. If yes, the routine shifts to step 504; if no, the routine is ended.

In step. 504, the calculation value RBL(c) is increased by the difference between RBL(c) and RBLrec, and used as a straight running determination threshold value RBLth(c+1) in the next cycle (i.e., determination counter value c+1). RBLrec is replaced with the present RBL(c) value in step 506, and the routine is ended.

Figure 9:
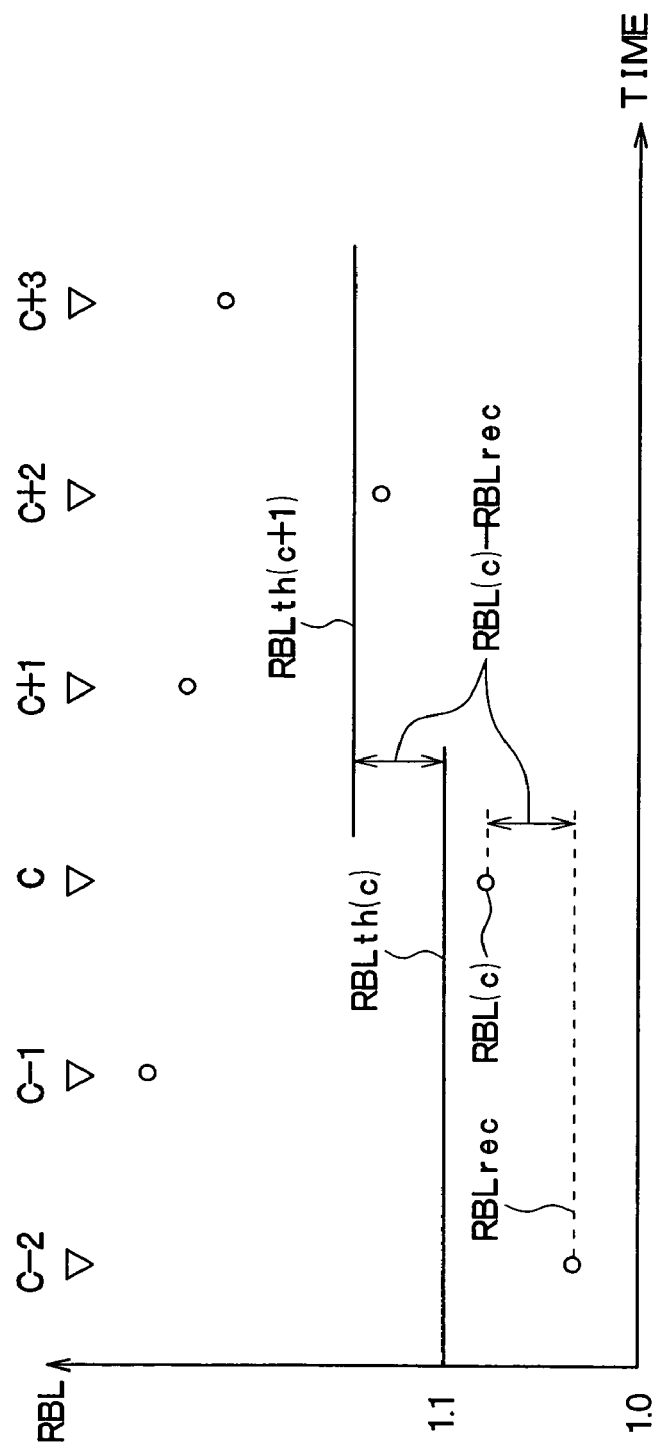
FIG. 9 is a time chart showing processing for control of a threshold value for determining straight running in the device for determining straight running of a vehicle according to the first embodiment of the present invention.

Circles in FIG. 9 show the RBL value at each time of CP detection (shown by ∇), and represent the conditions in which straight running (c−2, c, c+2) and turning (c−1, c+1, c+3) are alternately determined at every CP detection.

RBL(c) at the determination counter c is smaller than the threshold value RBLth(c), therefore straight running is determined. RBL(c) is greater than RBLrec during the previous straight running determination, that is, determination counter c−2 in FIG. 9, therefore RBLth(c)+(RBL(c)−RBLrec) is renewed to the new straight running determination threshold value RBLth(c+1), and used for the determination in the next cycle (determination counter c+1). FIG. 9 shows that a straight running state can be correctly determined even if the RBL value increases together with time in the straight running state. Thus, the straight running determination threshold value RBLth can be appropriately corrected and controlled in response to the RBL value, which changes according to the running state.

When the sequence of the processing described above is ended, the determination counter c is increased by 1 in step 128, and the processing returns to step 108 to detect the next CP.

As described above, the device for determining straight running of the vehicle according to the first embodiment determines the occurrence of a checkpoint CP (i.e., CP detection) when a change of the right and left wheel speed ratio RLR exceeds the level of the CP detection threshold value CPth when changing from small to large or large to small and determines straight running when a distance ratio RBL of the vehicle actual running distance RD and the linear distance LD between two points consisting of the previous CP and the present CP, is smaller than the threshold value RBLth. Accordingly, a straight running state can be accurately determined even during running with repeated long linear and turn areas such as test courses in particular.

Modifications of the First Embodiment

The first embodiment can be modified in various forms such as described below.

Figure 10:
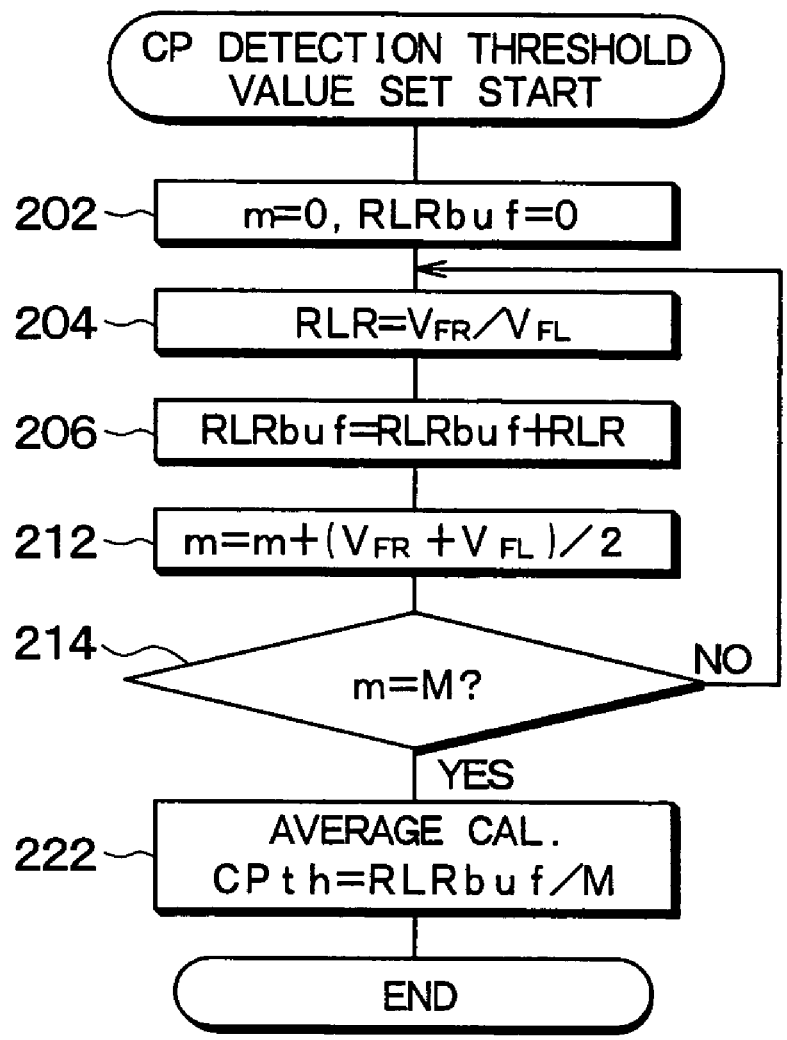
FIG. 10 is a flowchart of a modification of a CP detection threshold value CPth setting in the device for determining straight running of a vehicle according to the first embodiment of the present invention.

(1) The CP detection threshold value CPth in step 102 may be set as an average value of a fixed running distance as shown in a flowchart in FIG. 10, instead of an average value of the wheel speed ratio over a fixed time. That is, in step 202, a running distance counter m and the wheel speed ratio integrated buffer value RLRbuf are both initially set to 0. Steps 204 to 206 are identical to that in FIG. 3 and thus descriptions are omitted. In step 212, the running distance counter value m is increased by an increment of the right and left wheel speed average value (VFR+VFL)/2. In step 214, it is determined whether the running distance counter m is equal to a value M, which corresponds to predetermined distance set in advance. If it is equal, the processing shifts to step 222; if it is not equal, the processing shifts to step 204. In step 222, the CP detection threshold value CPth is set as a value that is obtained by averaging the wheel speed integrated buffer value RLRbuf with the predetermined distance value M. Thus, an appropriate CP detection threshold value can be set even if the running speed is greatly changed.

(2) The CP detection threshold value CPth in step 102 may be set to a fixed value regardless of the running state.

Figure 4:
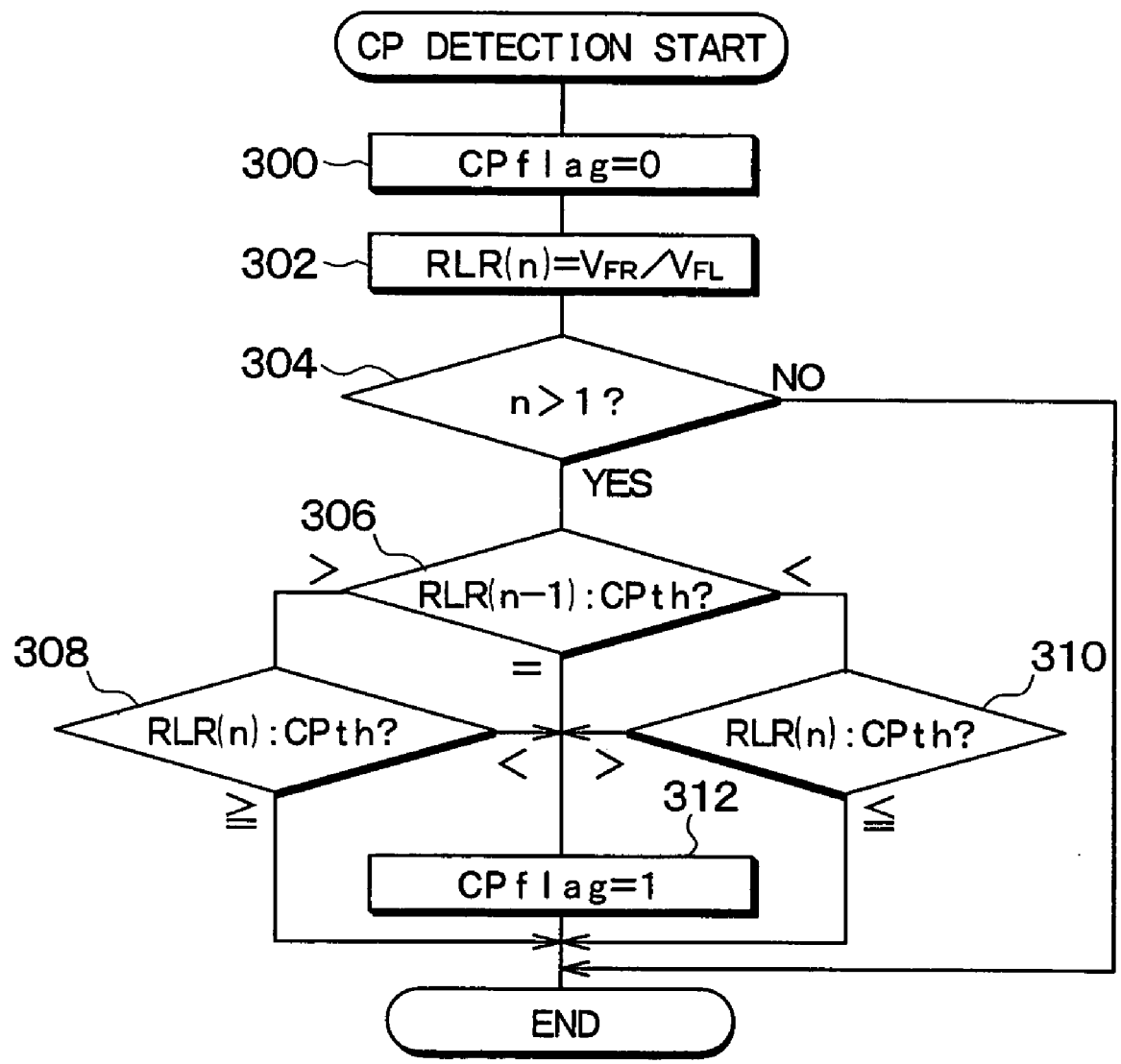
FIG. 4 is a flowchart for CP detection in the device for determining straight running of a vehicle according to the first embodiment of the present invention.
Figure 11:
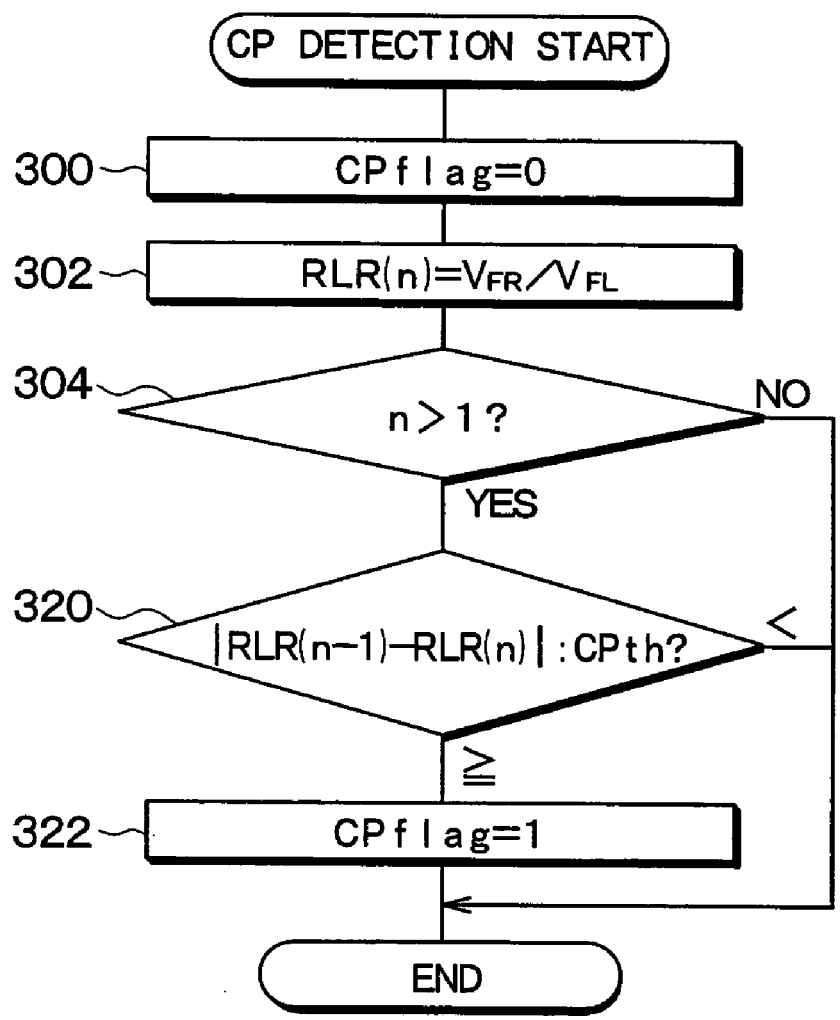
FIG. 11 is a flowchart of a modification of CP detection in the device for determining straight running of a vehicle according to the first embodiment of the present invention.

(3) With regard to CP detection in steps 104 and 118, in the above first embodiment, the occurrence of a CP is detected by whether a change in the wheel speed ratio RLR exceeds the level of the threshold value CPth as shown in FIG. 4. However, the same effect can be obtained by using a determination of whether a change amount RLRw of the wheel speed ratio is greater than the threshold value CPth as the determination standard. In a flowchart in FIG. 11, steps 300 to 304 are identical to those in FIG. 4 and thus descriptions are omitted. In step 320, if it is determined that an absolute value of the difference between the presently calculated wheel speed ratio RLR(n) and the previously calculated wheel speed ratio RLR(n−1) is equal to or greater than the CP detection threshold value CPth, the routine shifts to step 322; otherwise, the routine is ended. In step 322, CP flag CPflag is set to 1 since a CP was detected, and the routine is ended.

(4) The evaluation of the CP interval in step 116 may be omitted. If this step is omitted, all CPs detected through comparison of the wheel speed ratio RLR and the threshold value CPth are designated effective CPs, and a straight running/turning determination for each effective CP is executed.

Figure 8:
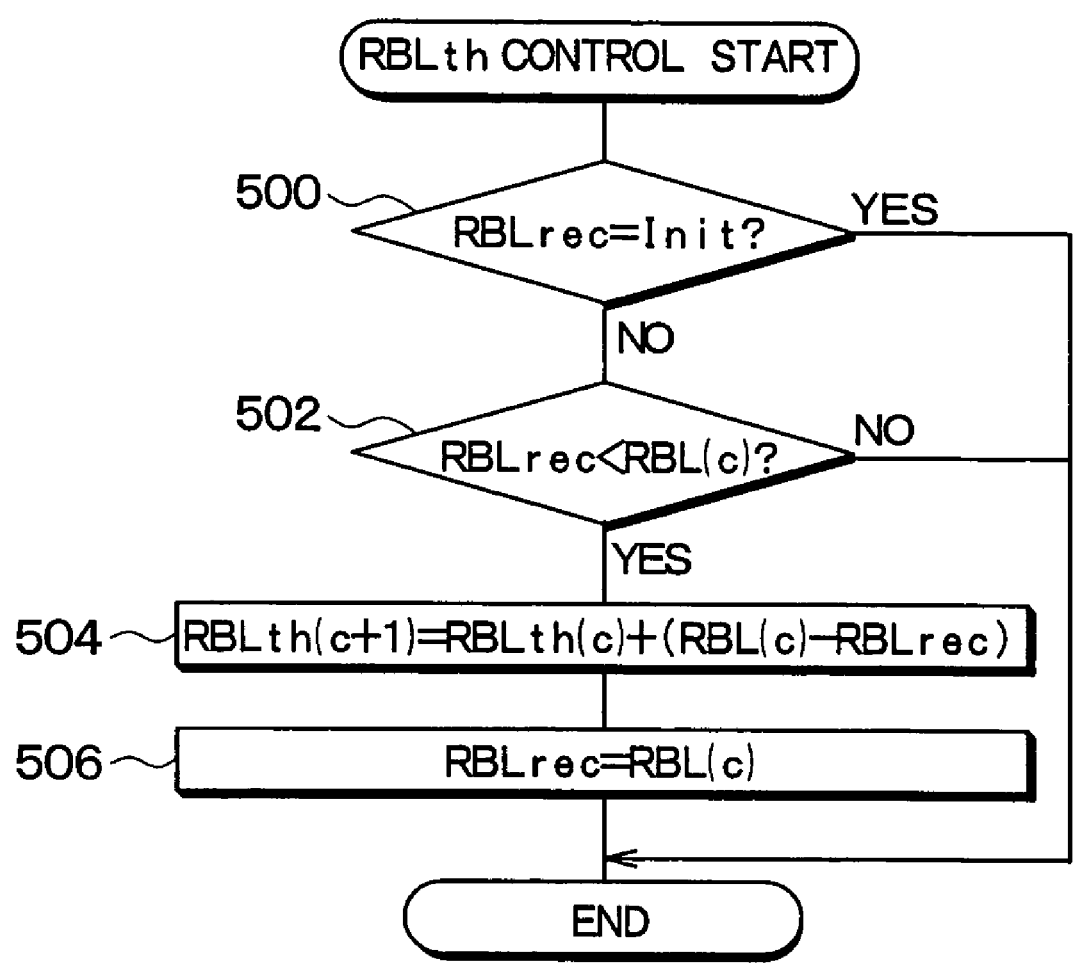
FIG. 8 is a flowchart for control of a threshold value for determining straight running in the device for determining straight running of a vehicle according to the first embodiment of the present invention.
Figure 12:
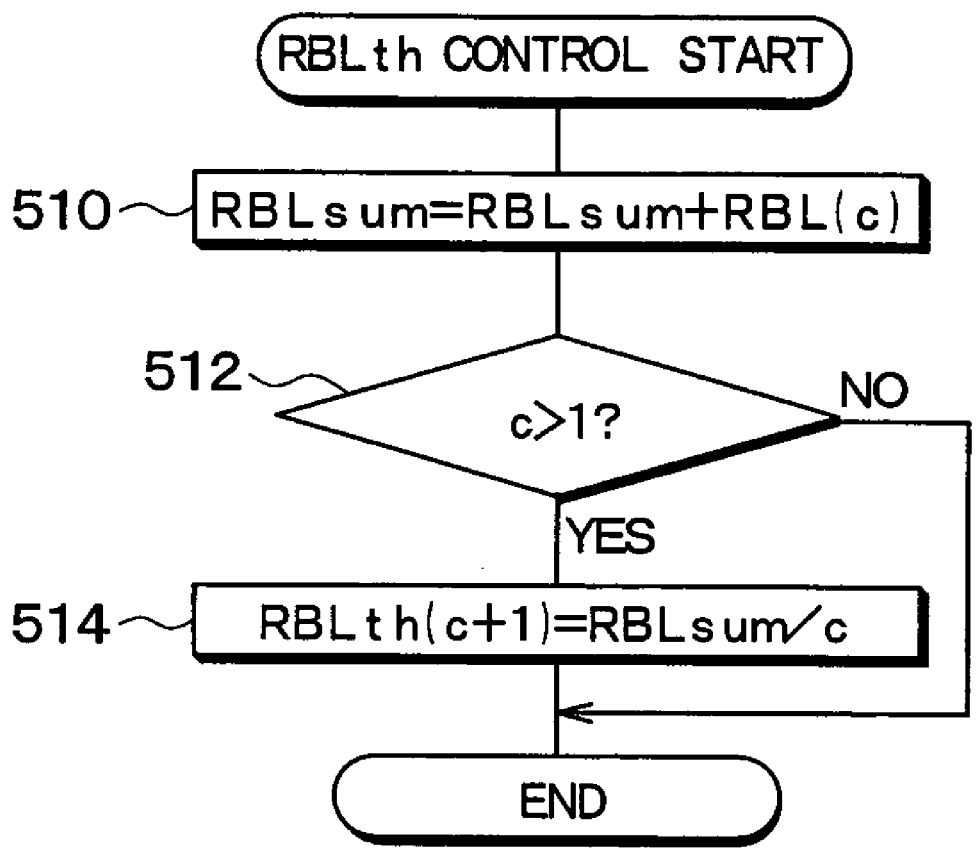
FIG. 12 is a flowchart of a modification of control of a threshold value for determining straight running in the device for determining straight running of a vehicle according to the first embodiment of the present invention.
Figure 13:
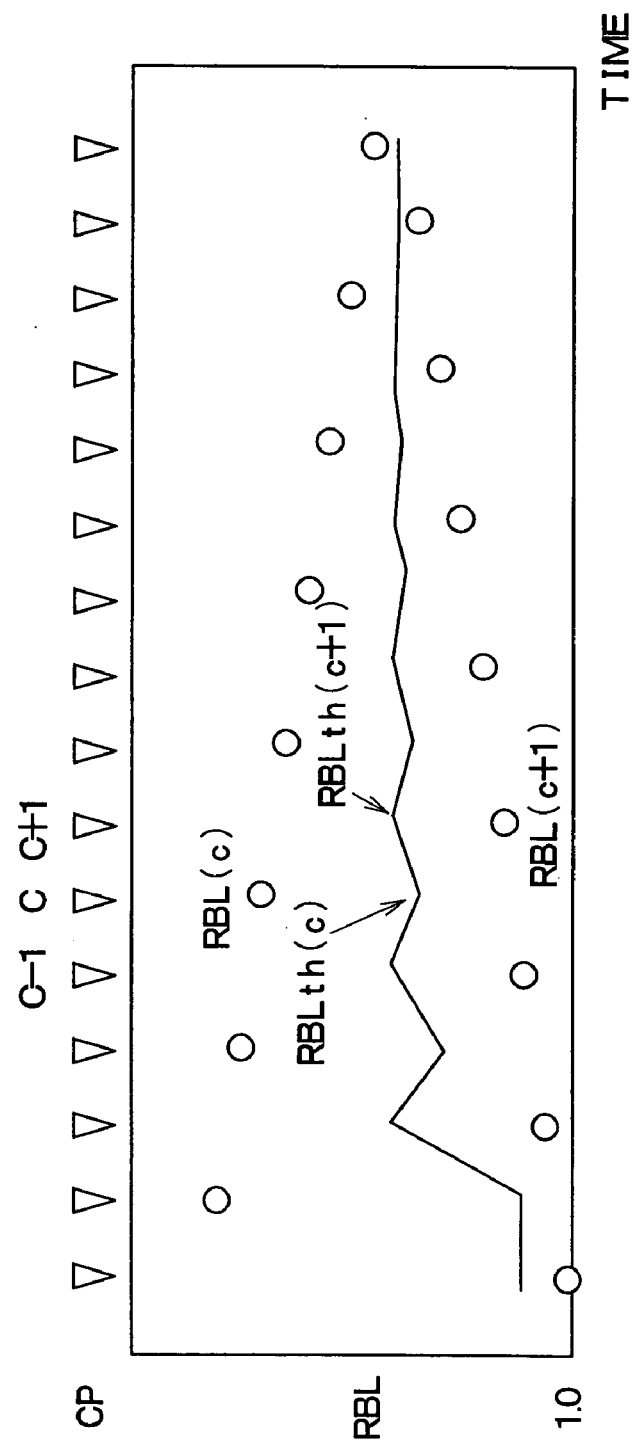
FIG. 13 is a time chart showing processing according to the flowchart in FIG. 10.

(5) The correction and control of the straight running determination threshold value RBLth in step 124 may be executed according to a flowchart in FIG. 12, instead of the flowchart in FIG. 8 described earlier. Note that the past integrated value of the RBL value is shown as RBLsum. In step 510, the cumulative value of the distance ratio RBL(c) used in the determination of straight running/turning is calculated and set as RBLsum. In step 512, it is confirmed that the determination counter c is equal to or greater than 2. In step 514, the straight running determination threshold value RBLth in the next cycle (i.e., determination counter value c+1) is set as an average value of an evaluation count c of the cumulative value RBLsum of the distance ratio, and the routine is ended. FIG. 13 shows the aforementioned processing conditions by means of an example in which the RBL value (shown by circles in FIG. 13) of the straight running and turning states that evaluated at every CP detection (shown by ∇ symbols in FIG. 13) approaches a fixed value together with time, that is, an example in which the straight running state group with a relatively small RBL value gradually increases the value, and the turning state group with a relatively large RBL value gradually decreases the value. The straight running determination threshold value RBLth is the average value of the cumulative value RBLsum of RBL, thus becoming the change center value of the RBL value. Accordingly, straight running and turning states can be correctly determined even when the RBL value subject to comparison changes in response to the running state.

The modifications (1) to (5) above can be respectively used in the first embodiment in appropriate combinations as necessary.

Second Embodiment

Figure 14:
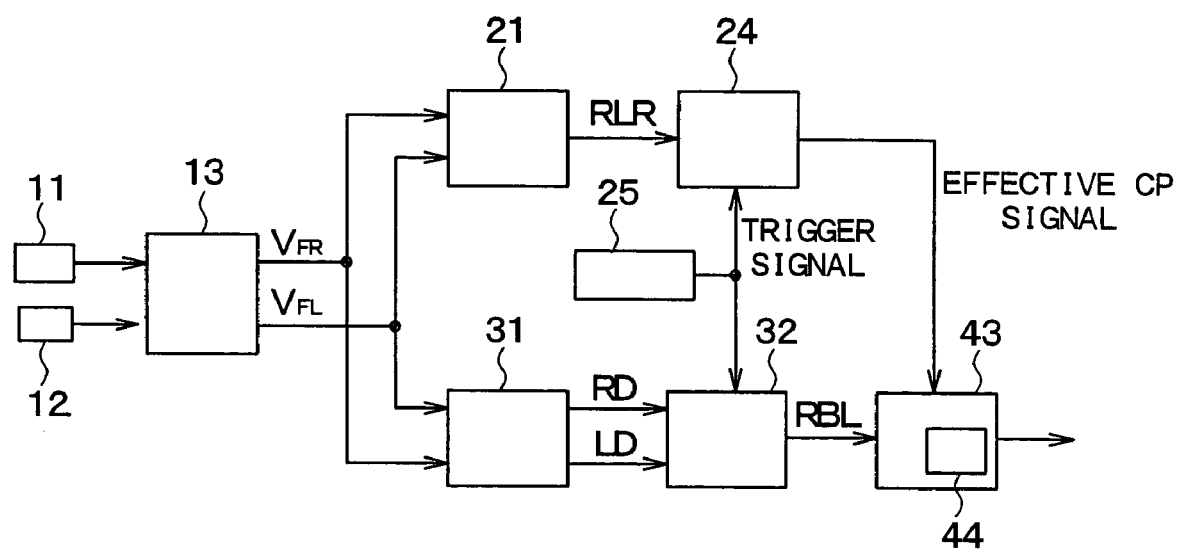
FIG. 14 is a function block diagram showing the construction of a device for determining straight running of a vehicle according to a second embodiment of the present invention.

FIG. 14 is a drawing showing a function block according to a second embodiment of the present invention. Functions identical to the first embodiment are denoted by the same reference symbols, and descriptions thereof are omitted. Furthermore, variables, constants and the like are also identical to the first embodiment, unless otherwise particularly specified.

A CP trigger generating mechanism 25 outputs a trigger signal at fixed intervals (for example, every 15 seconds), or at fixed running distances (for example, every 200 m). A wheel speed ratio change amount evaluating mechanism 24 is input with the right and left wheel speed ratio RLR output by the wheel speed ratio calculating mechanism 21 and the trigger signal from the CP trigger generating mechanism 25, for example, 10 signals. A trigger signal input timing at which the wheel speed ratio change amount RLRw is small, i.e., the wheel speed ratio having a small difference with the previous wheel speed ratio, is designated as an effective CP, and is output together with the corresponding wheel speed ratio RLR by the wheel speed ratio change amount evaluating mechanism 24.

A determining mechanism 43 determines a straight running state at a point of generation of an effective CP signal, at which the distance ratio RBL(c) of the actual running distance RD and the linear distance LD from the distance ratio calculating mechanism 32 is minimal at the time of input of the effective CP signal (i.e., the determination counter value c), which is a timing signal output by the wheel speed ratio change amount evaluating mechanism 24. Furthermore, the determining mechanism 43 has a straight running data selecting mechanism 44 to be described later, and the straight running data selecting mechanism 44 sets the wheel speed ratio RLR at a time an effective CP is determined, as a reference value for determining a straight running state. At subsequent checkpoints, if the wheel speed ratio is a value in the vicinity of the reference value for determining a straight running state, a straight running state is immediately determined.

Also in the second embodiment, identical to the first embodiment, the functions of each of the above mechanisms are realized by executing a computer program with a CPU in a controller (not shown), the operations of which will be described based upon flowcharts.

Figure 15:
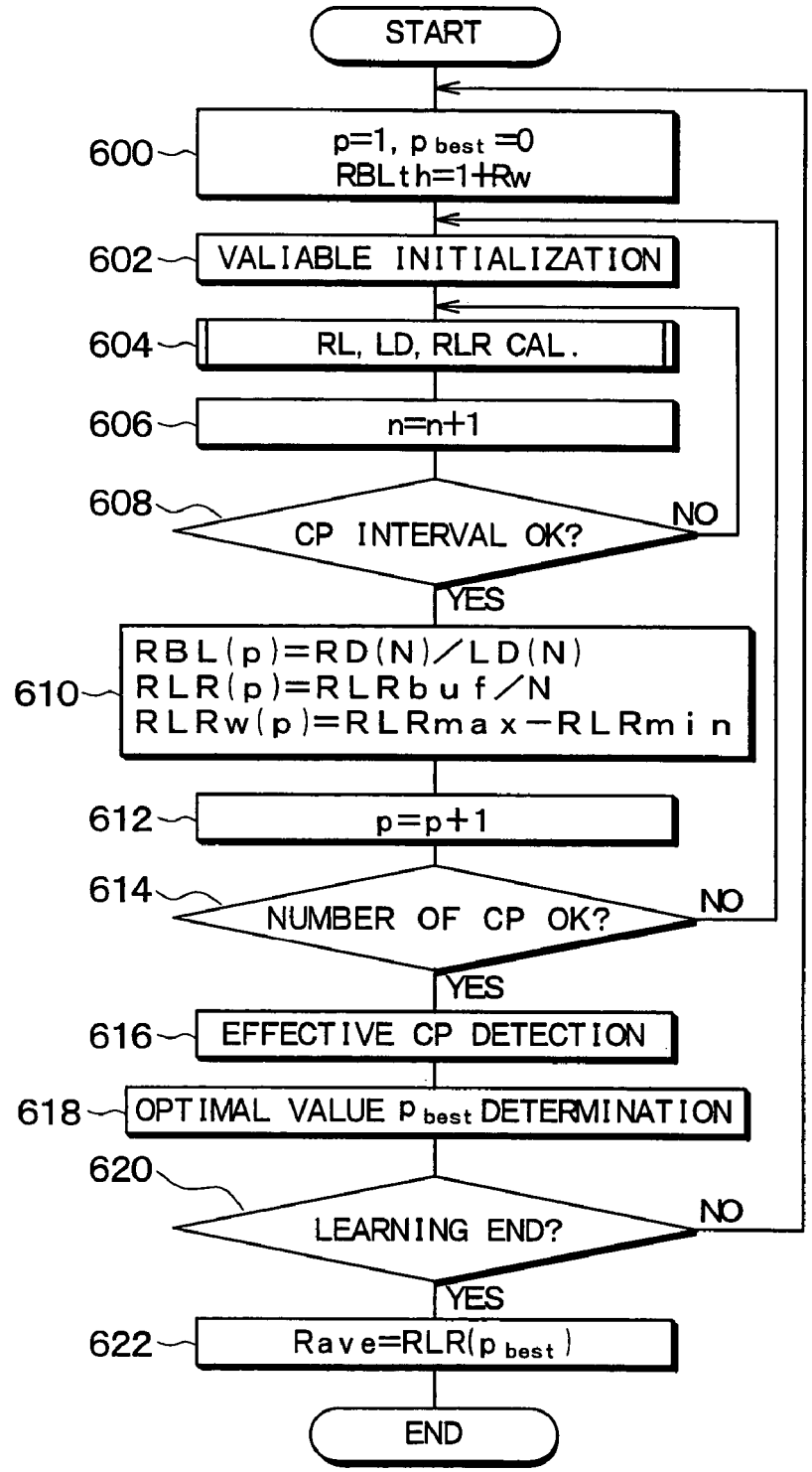
FIG. 15 is a main flowchart of the device for determining straight running of a vehicle according to the second embodiment of the present invention.
Figure 17:
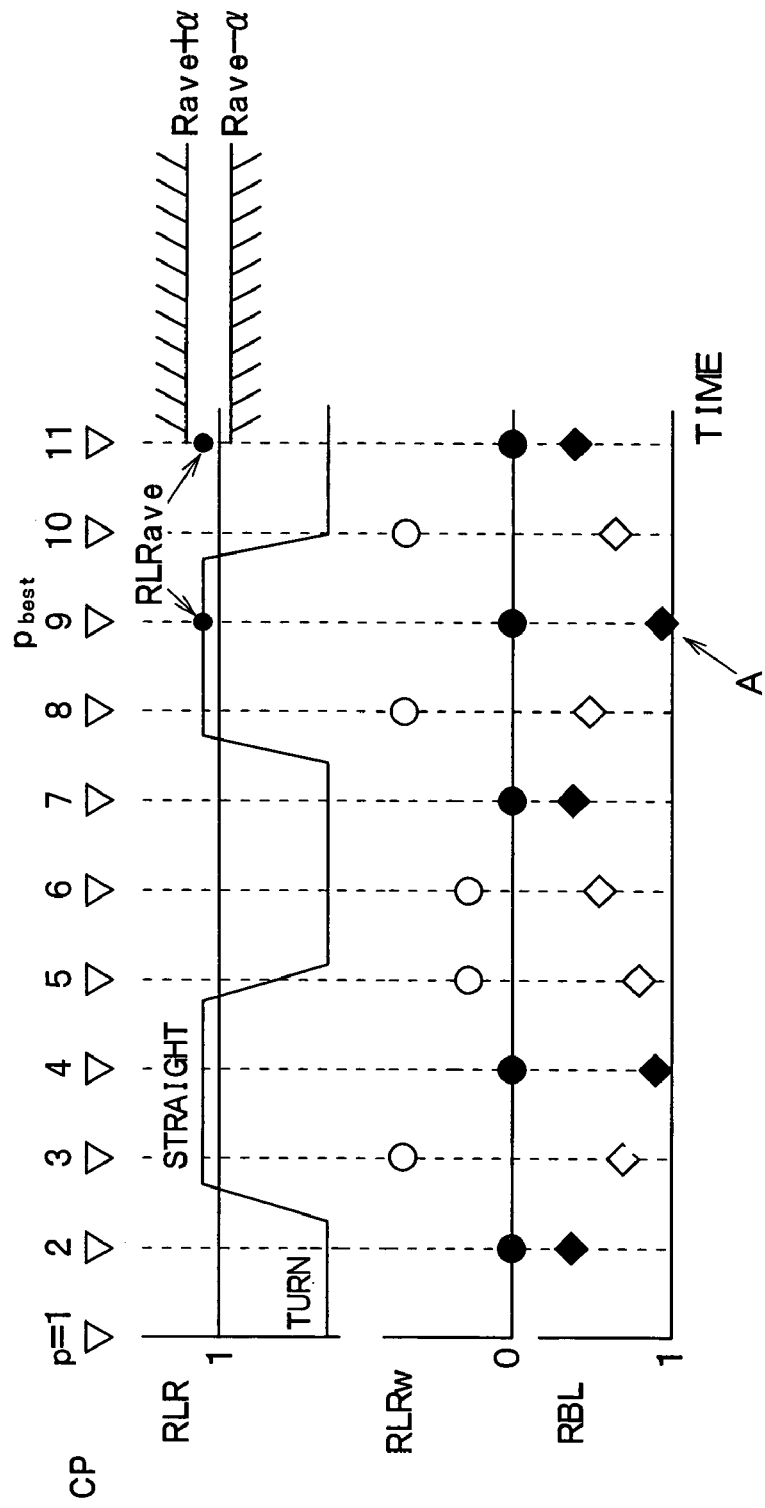
FIG. 17 is a time chart showing processing of the device for determining straight running of a vehicle according to the second embodiment of the present invention.

FIG. 15 is a drawing showing a main flow according to the second embodiment. In addition, FIG. 17 is a time chart showing processing thereof. In the second embodiment as well, the calculation cycle Δt is basically set to 1 second, as in the first embodiment, and the right and left wheel speeds VFR, VFL are output by the wheel speed calculating mechanism 13 every second.

When the vehicle is started, for example, when the vehicle starts running due to turning the ignition ON, first in step 600, a CP counter value p that counts CP generations is set to 1, and a CP counter value pbest at which straight running is determined based upon the distance ratio RBL is set to 0. In addition, the straight running determination threshold value RBLth is initialized to RBLth=1+Rw (=1.1). Next in step 602, variable initialization such as the following is executed. However, RLRmin is a minimum value of the right and left wheel speed ratio, and RLRmax is a maximum value of the right and left wheel speed ratio. Other variables are identical to that in the first embodiment.

(Equation 6)

$$RD(0)=LD(0)=0, RLRbuf(0)=0, RLRmin=999, RLRmax=-999, Vave=0,$$

$$X(0)=Y(0)=0, \theta all=0, n=1 \quad (6)$$

Figure 16:
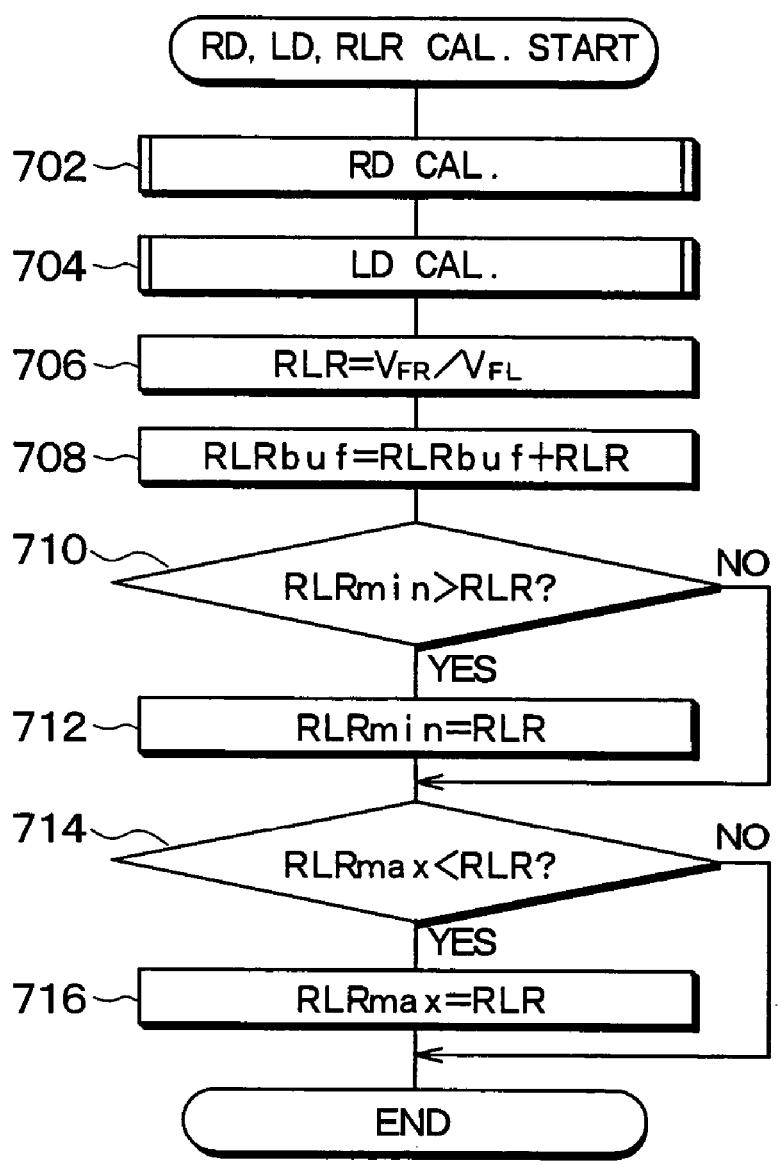
FIG. 16 is a flowchart for calculating an actual running distance, linear distance, and wheel speed ratio in the device for determining straight running of a vehicle according to the second embodiment of the present invention.

In step 604, the calculation of the actual running distance RD, the linear distance LD, and the distance ratio RLR is executed each time at which the wheel speeds VFR, VFL are output by the wheel speed calculating mechanism 13. The routine will be described in detail with reference to the flowchart in FIG. 16. RD is calculated in step 702, and LD is calculated in step 704. Each calculation processing is identical to each processing in steps 400 to 402 and steps 404 to 410 in FIG. 5, thus descriptions are omitted.

In step 706, the right and left wheel speed ratio RLR=VFR/VFL is calculated, and the wheel speed ratio integrated buffer value RLRbuf is increased by an increment of the calculated RLR in step 708.

Next in step 710, the calculated RLR and the wheel speed ratio minimum value RLRmin up to now are compared. If RLRmin>RLR, RLRmin is replaced in step 712 with RLR calculated in step 706; otherwise, the processing shifts to step 714. In step 714, RLR calculated in step 706 and the wheel speed ratio maximum value RLRmax up to now are compared. If RLRmax<RLR, RLRmax is replaced with the calculated RLR; otherwise, the routine is ended. Thus, RD, LD, and RLR are calculated in the calculation cycle Δt, and the maximum and minimum values of RLR are updated. The processing from steps 706 to 716 corresponds to the function of the wheel speed ratio calculating mechanism 21.

Next in step 606, the calculation counter n is increased by 1, and then in step 608, it is determined whether a CP should be set through evaluation of the CP interval. That is, in step 608, it is determined whether the calculation counter value n has reached N (for example, 15, a number corresponding to 15 seconds), which corresponds to a preset fixed time, and the routine repeatedly returns to step 604 until N is reached. Or, the CP interval may be evaluated in step 608 by determining whether the actual running distance RD has reached a fixed running distance RDth (for example, a number corresponding to 1 km), instead of the fixed time.

In step 608, if the CP interval is determined appropriate, that is, if it is determined that the calculation counter n has reach the fixed time N, or the actual running distance RD has reached the fixed distance RDth, a CP is thereby detected, and in step 610, a distance ratio RBL(p), a wheel speed ratio RLR(p), and a wheel speed ratio change amount RLRw(p) at the CP counter value p are respectively calculated from equation 7. Note that equation 7 indicates a case where the fixed time N is reached. The actual running distance and the linear distance are calculated between two points consisting of the previous CP and the present CP through execution of step 608.

(Equation 7)

$$RBL(p)=RD(N)/LD(N), RLR(p)=RLRbuf/N,$$

$$RLRw(p)=RLRmax-RLRmin \quad (7)$$

Next in step 612, the CP counter value p is increased by an increment of 1, and it is determined whether the number of the CP detected in step 614 has reached a predetermined number P (for example, 10). The routine repeatedly returns to step 602 until the predetermined number P is reached. When describing the processing conditions with the time chart in FIG. 17, a CP preset (i.e., detected), for example, at every 15 seconds is shown by a ∇ symbol. The CP counter value p is increased by 1 at each time the set CP is generated. The value of the wheel speed ratio RLR, which is a wheel speed relative value, is calculated in the one-second calculation cycle, and changes in response to the straight running or turning state. Furthermore, the wheel speed ratio change amount RLRw(p) and the distance ratio RLB(p) are synchronized with the trigger signal and calculated at each CP. The wheel speed ratio change amount RLRw(p) and the distance ratio RLB(p) are shown by circle and diamond symbols, respectively.

In step 616, effective CPs are selected from among set and detected CPs according to the following processing. That is, a certain proportion of RLRw, for example, half of P, starting with those having smaller values are designated as effective from among the P−1 change amount RLRW of RLR calculated in step 604, and a CP at that time is designated an effective CP. In FIG. 17, an effective RLRW is shown by a black dot, and an invalid RLRw is shown by a circle. Alternatively, a wheel speed ratio change amount threshold value RLRwth is preset, an RLRw value equal to or less than RLRwth is designated effective, and the CP at that time may be designated an effective CP. Thus, since the reliability of detected and calculated values is high at the CP with a relatively small RLRw, such the CP can be extracted so as to be set as an effective CP.

The processing from steps 606 to 616 corresponds to the functions of the distance ratio calculating mechanism 32 and the wheel speed ratio change amount evaluating mechanism 24.

Next in step 618, the CP counter value (p=9 in FIG. 17) for the effective CP (point A in FIG. 17) at which the smallest RBL value can be obtained from among distance ratio RBL values calculated in step 610 is set as a CP counter value at which straight running is determined, that is, an optimal value pbest. If pbest is not 0 in step 620, it is determined that the initial straight running determination learning is ended and the processing shifts to step 622; otherwise, the processing returns to step 600 and again repeats the initial learning processing. The processing in steps 618 and 620 corresponds to the function of the determining mechanism 43.

In step 622, as the initial learning result, the wheel speed ratio RLR, which is the wheel speed relative amount for the optimal CP counter value pbest, is set as a wheel speed ratio threshold value Rave that serves as a reference value for determining a straight running state in subsequent straight running determinations, i.e., a change center value of the wheel speed ratio during straight running, and the initial learning processing is ended. In subsequent straight running determinations, using the wheel speed ratio threshold value Rave being the initial learning value, the straight running data selecting mechanism 44 continues the processing according to an algorithm, where a straight running state is determined when the average value RLR(p) for every CP (for example, every 15 seconds) of the wheel speed ratio RLR calculated in a one-second calculation cycle is in the range of Rave−α<RLR(p)<Rave+α, where α is a predetermined value indicating a value in the vicinity of Rave. The processing in this step corresponds to the function of the straight running data selecting mechanism 44 included in the determining mechanism 43.

In the second embodiment as described above, CPs with a relatively small wheel speed ratio change amount are extracted as highly reliable CPs from among a predetermined number of CPs provided at every fixed time or running distance. The extracted CPs are then set as effective CPs, and an effective CP with the smallest distance ratio among these CPs is determined as a straight running state. Consequently, a straight running state can be reliably determined through such a simple processing. Moreover, an accurate determination processing can be continued through a simple processing, because the wheel speed ratio when a straight running state is determined as described above is used as a reference value for determining a straight running state thereafter, and compared with wheel speed ratios sequentially calculated during running.

Modifications of the Second Embodiment

The second embodiment can be modified in various forms such as described below.

(6) As a method for setting the optimal value pbest from among effective CPs, in steps 616 and 618, instead of evaluating the wheel speed ratio change amount RLRw the CP counter value p of the CP at which the distance ratio RBL of the actual running distance and the linear distance is the smallest can be simply set as pbest. In this case, calculating the wheel speed ratio change amount RLRw in step 610 is not required.

Modifications of the First and Second Embodiments (7) In a vehicle with an ABS (Anti Lock Brake System) apparatus, the slip state of each wheel is calculated for the apparatus control, therefore in the case where both a tire pressure determining device and an ABS apparatus are provided, CP setting or determining a straight running state may be prohibited when a wheel slip state is detected, for example, in one or more wheels, or when a slip state is detected in right or left wheels through processing that calculates right and left wheel speeds used for determining a straight running state.

What is claimed is:

1. A device for determining straight running of a vehicle, comprising:
    a wheel speed detecting mechanism for detecting a right and left wheel speed of the vehicle;
    a distance calculating mechanism for calculating an actual running distance actually traveled by the vehicle between two points and a linear distance between the two points based upon the detected wheel speed;
    a distance comparing and calculating mechanism for comparing the calculated actual running distance and linear distance, and calculating a distance comparison value; and
    a determining mechanism for determining straight running based upon the distance comparison value.

2. A device for determining straight running of a vehicle, comprising:
    a wheel speed detecting mechanism for detecting a right and left wheel speed of the vehicle;
    a wheel speed relative amount calculating mechanism for calculating a wheel speed relative amount between right and left wheel speeds from the detected wheel speed;

a checkpoint detecting mechanism for detecting an effective checkpoint for setting a point for determining straight running based upon the calculated wheel speed relative amount;

a distance calculating mechanism for calculating an actual distance actually traveled by the vehicle between two points and a linear distance between the two points based upon the detected wheel speed;

a distance comparing and calculating mechanism for comparing the calculated actual running distance and linear distance, and calculating a distance comparison value; and a determining mechanism for determining straight running based upon the distance comparison value and the detected effective checkpoint.

3. The device for determining straight running of a vehicle according to claim 1 or 2, wherein the distance calculating mechanism calculates the actual running distance by integrating the wheel speed from a calculation start time.

4. The device for determining straight running of a vehicle according to claim 1 or 2, wherein the distance calculating mechanism sets a calculation start time as a start point, and calculates the linear distance as a linear distance from the start point up to the present time point.

5. The device for determining straight running of a vehicle according to claim 2, wherein the distance calculating mechanism sets the effective checkpoint as a start point, and calculates a linear distance from the start point every calculation cycle.

6. The device for determining straight running of a vehicle according to claim 4, wherein the distance calculating mechanism calculates a turning angle of the vehicle from the vehicle wheel tread and right and left wheel speeds, calculates a coordinate at the present time point based upon a cumulative value of the turning angle from the start point and the wheel speeds, and calculates the linear distance from the coordinate.

7. The device for determining straight running of a vehicle according to claim 2, wherein the distance comparing and calculating mechanism sets the effective checkpoint as one time point of the two points, and performs a calculation that sets a ratio of an actual running distance and a linear distance between the two effective checkpoints as the distance comparison value.

8. The device for determining straight running of a vehicle according to claim 2, wherein the checkpoint detecting mechanism detects the effective checkpoint by comparing the wheel speed relative amount and a checkpoint threshold value.

9. The device for determining straight running of a vehicle according to claim 8, wherein the checkpoint detecting mechanism detects the effective checkpoint in any one of the cases when the wheel speed relative amount changes from a value lesser to a value greater than the checkpoint threshold value, and when the wheel speed relative amount changes from a value greater to a value lesser than the checkpoint threshold value.

10. The device for determining straight running of a vehicle according to claim 2, wherein the checkpoint detecting mechanism detects the effective checkpoint by comparing a change amount of the wheel speed relative amount and a checkpoint threshold value.

11. The device for determining straight running of a vehicle according to claim 1, wherein the determining mechanism determines straight running by comparing the distance comparison value and a straight running determination threshold value.

12. The device for determining straight running of a vehicle according to claim 2, wherein the checkpoint detecting mechanism detects the effective checkpoint by extracting a predetermined checkpoint from among preset checkpoints based upon the size of a change amount of the wheel speed relative amount.

13. The device for determining straight running of a vehicle according to claim 12, wherein the checkpoint detecting mechanism extracts and detects as the effective checkpoint from among preset checkpoints, a checkpoint at which the size of a change amount of the wheel speed relative amount is in a predetermined range.

14. The device for determining straight running of a vehicle according to claim 12 or 13, wherein the determining mechanism determines straight running at an effective checkpoint at which a difference between the actual running distance and the linear distance becomes the smallest value among the distance comparison values of the effective checkpoints.

15. The device for determining straight running of a vehicle according to claim 14, wherein the determining mechanism further includes a straight running data selecting mechanism, and the straight running data selecting mechanism sets a wheel speed relative amount when straight running is determined as a reference value for determining a straight running state, and determines a straight running state when a wheel speed relative amount at the preset checkpoint following a setting time point of the reference value for determining a straight running state is a value in the vicinity of the reference value for determining a straight running state.

* * * * *